Patented Mar. 24, 1953

2,632,760

UNITED STATES PATENT OFFICE 2,632,760

7-HYDROXYPTERIDINES

Rudolf Tschesche, Hamburg-Blankenese, Germany, assignor to Nordmark-Werke G. m. b. H., Uetersen/Holstein, Germany, a corporation of Germany No Drawing. Application March 5, 1951, Serial No. 214,031. In Germany March 25, 1950

9 Claims. (Cl. 260—251.5)

This invention relates to substituted pteridines and more particularly to 6-substituted methyl-7-hydroxypteridines, and the method for their preparation.

The novel compounds of the present invention are represented by the formula

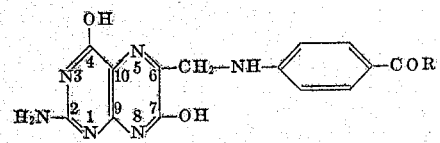

wherein R represents a hydroxyl group or a nitrogen-linked glutamic acid residue. When R is a hydroxyl group, the compound is 7-hydroxypteroic acid; and when R is a nitrogen-linked glutamic acid residue, the compound is 7-hydroxyfolic acid; and the compounds are so named hereinafter. The compounds are insoluble in water and acidic aqueous solutions, and soluble in solutions of bases to form salts, which are considered to be within the scope of the invention.

The new substituted 6-methyl-7-hydroxypteridines possess valuable pharmacological properties and in particular exhibit activity similar to that of vitamin $B_{12}$.

Broadly speaking, the new compounds are prepared by condensing a 2-amino-4,7-dihydroxy-6-halomethylpteridine with a p-aminobenzoyl compound. The p-aminobenzoyl compound may be p-aminobenzoic acid, or a salt or ester of p-aminobenzoic acid, in which case 7-hydroxypteroic acid is formed; or p-aminobenzoylglutamic acid or an ester thereof, whereupon 7-hydroxyfolic acid is formed. The method for the synthesis of the new compounds is illustrated by the following series of equations showing the preparation of 7-hydroxyfolic acid. In the formulae, X designates a halogen of low molecular weight, i. e., chlorine or bromine.

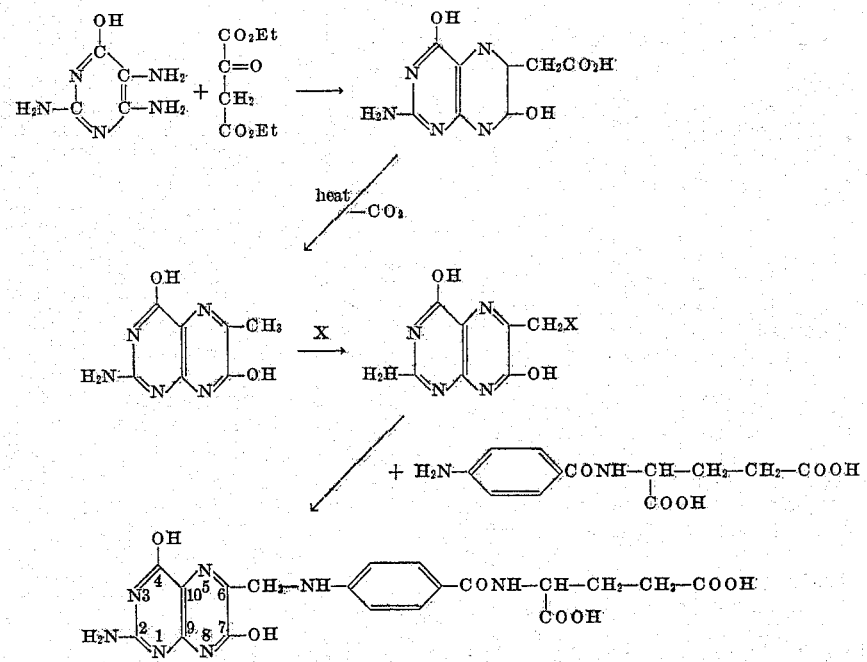

Broadly speaking, and referring to the series of equations, 2,9,10-triamino-4-hydroxypteridine and oxalacetic ester are condensed by heating in inert solvent solution to form 2-amino-4,7-dihydroxypteridine acetic acid-6, which is decarboxylated in the usual manner by heating over a range of temperature up to about 300° C. to yield 2-amino-4,7-dihydroxy-6-methylpteridine. Halogenation of the 6-methylpteridine with chlorine or bromine according to the usual methods results in the formation of 2-amino-4,7-dihydroxy-6-halomethylpteridine, which is condensed by heating in mutual inert solvent solution with p-aminobenzoylglutamic acid to form 7-hydroxyfolic acid.

The 2,4,5-triamino-6-hydroxypyrimidine which is an intermediate in the preparation of the new compounds is a known compound and is readily prepared by methods which have been described in the chemical literature. It exists in tautomeric forms and any of such forms may be employed in the preparation, as well as the acid salts thereof.

2 - amino -4,7- dihydroxy -6- methylpteridine is believed to be a compound previously unknown to the art, and its synthesis is therefore shown in detail in the series of equations supra, and in the examples which are to follow.

Salts of 7-hydroxyfolic acid and 7-hydroxypteroic acid are readily formed by the reaction of stoichiometrically equivalent amounts of the selected acid and a metallic, ammonium or organic base in a mutual solvent. Thus, for example, the alkali metal salts may be formed by dissolving 7-hydroxyfolic acid or 7-hydroxypteroic acid in a dilute aqueous solution of the desired alkali metal hydroxide, from which they are recovered by evaporation of the solvent. Other methods of preparation will be apparent to the art.

The preferred salts are those of low toxicity having substantial solubility in water, such as the alkali and alkaline earth metal salts, and simple ammonium salts.

The following examples will more specifically illustrate the preparation of the novel substituted 6-methyl-7-hydroxypteridines.

EXAMPLE 1

*2 - amino - 4,7 - dihydroxy - 6 - bromomethylpteridine*

A mixture of 11 g. of 2,4,5-triamino-6-hydroxypyrimidine and 20 g. of oxalacetic ester in 150 cc. of glacial acetic acid was heated for about 1 hour on a boiling water bath with repeated shaking. A granular precipitate began to form after a few minutes of heating. 150 cc. of water were added and heating was continued for 30 minutes more, whereupon the yellow crude 2-amino-4,7-dihydroxypteridineacetic acid-6 formed in the reaction was filtered, taken up in hot alkaline solution, and precipitated therefrom by means of hot 2 N hydrochloric acid. The 2-amino-4,7-dihydroxypteridineacetic acid-6 was heated in a flask on a metal bath at about 250° C. until the evolution of carbon dioxide ceased. The 2-amino-4,7-dihydroxy-6-methylpteridine produced by decarboxylation was suitable for further synthetic procedures without additional purification.

Analysis:
  Calculated for $C_7H_7O_2N_5$, C, 43.51; H, 3.62; N, 36.26
  Found: C, 42.83; H, 3.89; N, 35.89

A solution of 1.5 g. of 2-amino-4,7-dihydroxy-6-methylpteridine in 10 cc. of concentrated sulfuric acid was heated with 40 cc. of glacial acetic acid and 0.4 cc. of dry bromine for 2 minutes under reflux. Hydrogen bromide was evolved and a white crystalline precipitate of 2-amino-4,7-dihydroxy-6-bromomethylpteridine was formed immediately. The reaction mixture was allowed to stand for 12 hours and the bromomethylpteridine was filtered and washed with successive portions of glacial acetic acid and acetone.

Analysis:
  Calculated for $C_7H_6O_2N_5Br$, Br, 29.4
  Found: Br, 29.9

EXAMPLE 2

*7-hydroxyfolic acid*

A mixture of 0.7 g. of 2-amino-4,7-dihydroxy-6-bromomethylpteridine, 0.7 g. of p-amino-benzoylglutamic acid diethylester and 50 cc. of ethylene glycol was heated for 3 hours to a temperature of about 100–120° C. The cooled solution was treated with 300 cc. of methanol and the reaction mixture was permitted to stand for 12 hours in the refrigerator.

The precipitated diethyl ester of 7-hydroxyfolic acid was filtered and washed with methanol. A yield of 0.35 g. of diethyl ester of 7-hydroxyfolic acid was obtained. The removal of the ester groups was accomplished by dissolving the crude diethylester of 7-hydroxyfolic acid in 50 cc. of 0.1 N sodium hydroxide solution and allowing the solution to stand for 12 hours at room temperature. The pH was thereafter brought to pH 3.5 with acetic acid. After standing for 10 hours in the refrigerator, the precipitated 7-hydroxyfolic acid was filtered, washed with water and dried. A yield of 10 percent of the theoretical yield was obtained.

Microbiological tests carried out according to the procedure of Teply et al., J. B. C., 157, 303, (1945), on *Streptococcus faecalis R.*, showed that 7-hydroxyfolic acid thus prepared had vitamin $B_{12}$ activity.

EXAMPLE 3

*7-hydroxypteroic acid*

A mixture of 1.5 g. of ethyl-p-aminobenzoate, 0.7 g. of 2-amino-4,7-dihydroxy-6-bromomethylpteridine prepared according to the procedure of Example 1, and 40 cc. of ethylene glycol was heated for 3 hours at about 100–120° C. The cooled solution was diluted with 300 cc. of methanol and permitted to stand for 12 hours in a refrigerator. The precipitate, comprising the ethyl ester of 7-hydroxypteroic acid formed in the reaction, was filtered and washed with methanol. The 7-hydroxypteroic acid ethyl ester was dissolved in 0.1 N sodium hydroxide solution, to remove the ester group. A precipitate of 7-hydroxypteroic acid formed upon acidification. The precipitated 7-hydroxypteroic acid was filtered, washed and dried. A yield of 10 percent of the theoretical yield was obtained.

7-hydroxypteroic acid thus prepared was found by microbiological tests to possess vitamin $B_{12}$ activity.

EXAMPLE 4

A mixture of 1.0 g. of 2-amino-4,7-dihydroxy-6-methylpteridine and 1.2 g. (0.4 cc.) of bromine were heated in a sealed tube to a temperature of 155 to 160° C. for about 2 hours. The tube was then opened and the 2-amino-4,7-dihydroxy-6-bromo-methylpteridine formed in the reaction was placed in a dessicator over potassium oxide until all hydrogen bromide contained therein was removed. The 2-amino-4,7-dihydroxy-6-bromomethylpteridine was then condensed with 1.0 g. of p-aminobenzoic acid in 50 cc. of ethylene glycol, according to the procedure of Example 3. The yield of 7-hydroxypteroic acid was 8 percent of the theoretical yield.

I claim:
1. A compound selected from the group consisting of a compound represented by the formula

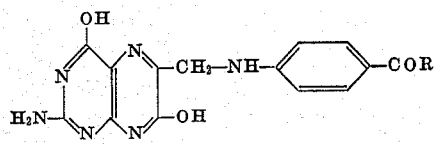

wherein R represents a member of the group consisting of hydroxyl and a nitrogen-linked glutamic acid residue; and salts thereof.

2. Salts of 7-hydroxyfolic acid represented by the formula

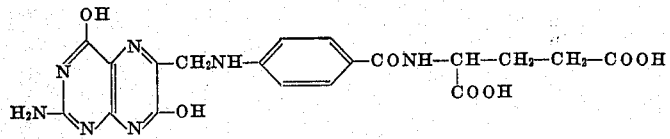

3. 7-hydroxyfolic acid represented by the formula

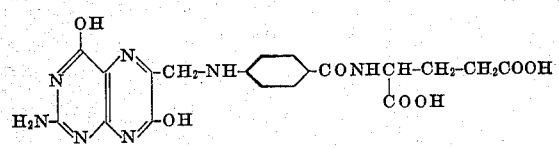

4. Salts of 7-hydroxypteroic acid represented by the formula

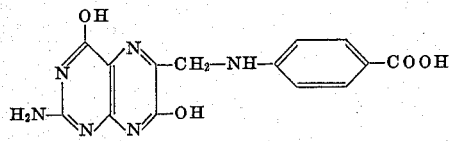

5. 7-hydroxypteroic acid represented by the formula

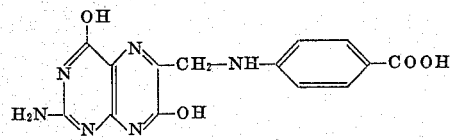

6. In the method for the preparation of a compound represented by the formula

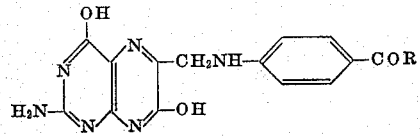

wherein R represents a member of the group consisting of hydroxyl, and a nitrogen-linked glutamic acid residue, the step which comprises condensing a compound represented by the formula

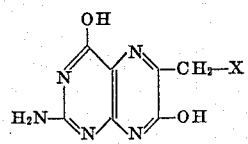

wherein X represents a halogen atom selected from the group consisting of chlorine and bromine, with a member of the group consisting of p-aminobenzoic acid, salts of p-aminobenzoic acid with bases, esters of p-aminobenzoic acid, p-aminobenzoylglutamic acid and esters of p-aminobenzoylglutamic acid.

7. In the process for the preparation of 7-hydroxyfolic acid, the step which comprises condensing 2-amino-4,7-dihydroxy-6-bromomethylpteridine with diethyl p-aminobenzoylglutamate.

8. The process for the preparation of 7-hydroxyfolic acid which comprises condensing 2-amino - 4,7 - dihydroxy-6-bromomethylpteridine with an ester of p-aminobenzoylglutamic acid, saponifying the ester of 7-hydroxyfolic acid thus formed, and recovering the 7-hydroxyfolic acid.

9. In the process for the preparation of 7-hydroxypteroic acid, the step which comprises the condensation of 2-amino-4,7-dihydroxy-6-bromomethylpteridine with a compound of the group consisting of p-aminobenzoic acid and salts of p-aminobenzoic acid with bases and esters of p-aminobenzoic acid, in inert solvent solution.

RUDOLF TSCHESCHE.

REFERENCES CITED

The following references are of record in the file of this patent:

Chemical Abstracts 44, 8422g (1950), citing Tschesche, Z. Naturforsch. 5b 132–6 (1950).